United States Patent Office 3,152,468
Patented Oct. 13, 1964

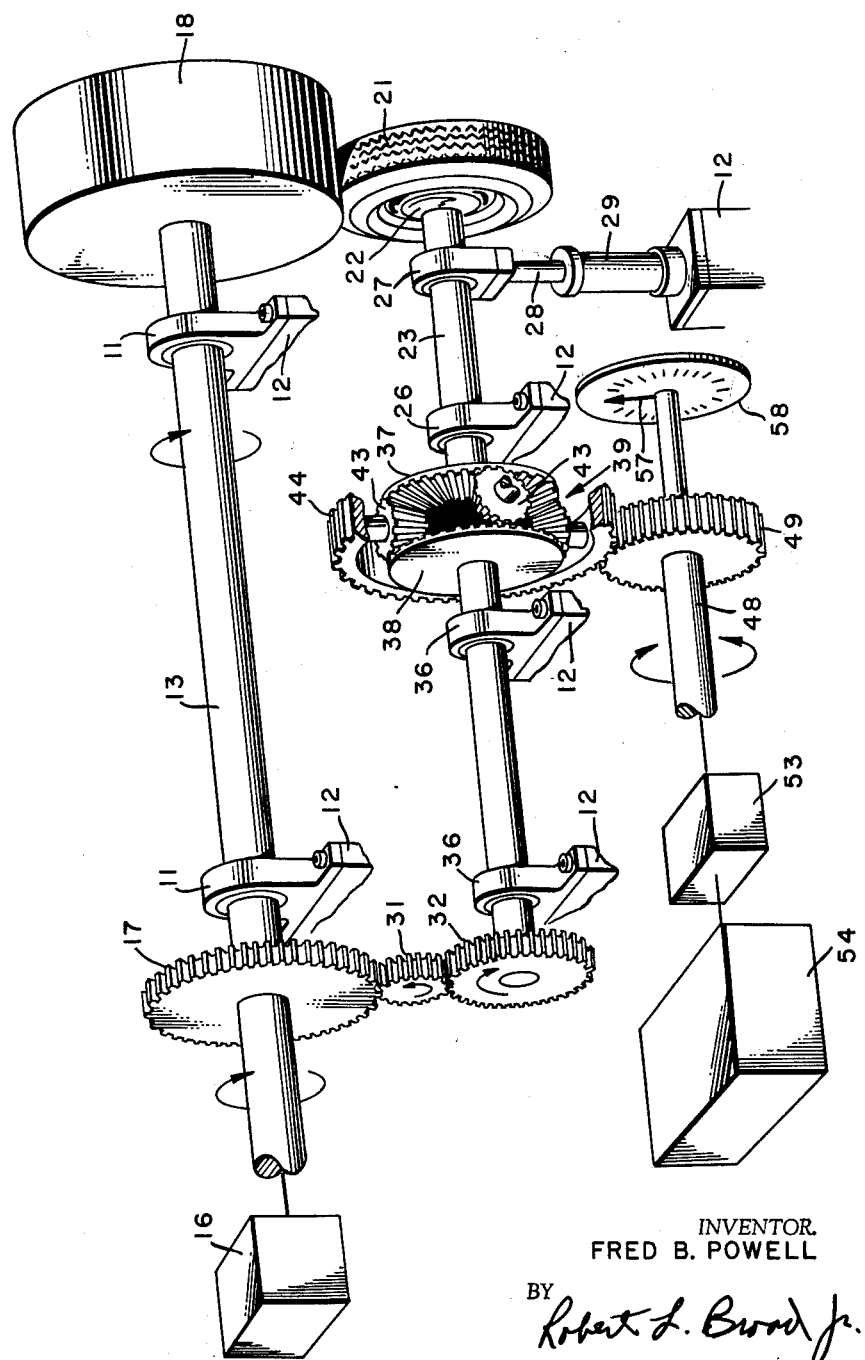

3,152,468
APPARATUS FOR TESTING TIRES
Fred B. Powell, Decatur, Ala., assignor to Monsanto Company, a corporation of Delaware
Filed Jan. 22, 1963, Ser. No. 253,532
8 Claims. (Cl. 73—8)

This invention relates to testing systems and more particularly to systems for testing a tire under simulated braking and accelerating conditions.

In the conventional tire testing system the tire is mounted on a spindle and urged against a rotating drum. In this test the tire "sees" an environment somewhat like that of a front tire of an automobile, since the only power transmitted through the tread of the tire is that power needed to overcome the rolling friction of the tire, and the windage and bearing friction. The tire does not experience the stresses common in braking and acceleration. With this in mind, one of the objects of this invention is to provide a novel and improved testing system.

Another object of this invention is to provide a tire testing system wherein the tire is tested under conditions experienced by a rear tire on an automobile.

A further object of this invention is to provide a tire testing system wherein the tire under test is subjected to braking and acceleration stresses.

Still another object of this invention is to provide an apparatus for measuring the creep or slippage of a test tire relative to a drum driving the tire.

Another object of this invention is to provide a system for testing an article or device under load without power dissipation from the system.

Yet another object of this invention is to provide a system for testing a tire under braking conditions without a transfer of energy from the system.

One embodiment of the present invention contemplates a system wherein a drive shaft rotates a drive gear and a tire-driving drum. A tire in engagement with the drum is connected by a shaft to a side gear of a differential. The other side gear of the differential is connected to a spur gear connected through an idler gear to the drive gear. The rear ratio of the drive gear to the spur gear is equal to the diameter ratio of the drum and the tire so that the ring gear of the differential normally remains stationary, regardless of the speed of the tire. By urging the ring gear in one direction the tire is subjected to braking forces. Rotation of the ring gear in the other direction subjects the tire to acceleration forces.

Other objects and advantages of the invention will become apparent when the following detailed description is read in conjunction with the appended drawing, in which the single figure is a perspective view of one embodiment of the system showing the general construction of the apparatus.

Referring now in detail to the drawing, a pair of bearings 11 mounted on a base 12 (fragments of which are shown) are shown supporting a drive shaft 13 which is driven by a motor 16. The shaft 13 drives a drive gear 17 and a drum 18. The drum 18 drives a tire 21 mounted on a wheel 22 which is secured to an axle shaft 23, the axle shaft being journaled in bearings 26 and 27. The bearing 26 is mounted on the base 12 while the bearing 27 is secured to a piston rod 28 of a fluid cylinder 29 mounted on the base 12. The purpose of the cylinder 29 is to move the shaft 23 to urge the tire 21 against the drum 18. Suitable guides (not shown) may be provided in engagement with the bearing 27 for preventing lateral movement of the axle shaft 23.

The gear 17 operates through an idler gear 31 to drive a spur gear 32 secured to another axle shaft 33 which is journaled in bearings 36 mounted on the base 12. The axle shafts 23 and 33 are connected as shown to side gears 37 and 38 of a conventional differential 39. The differential 39 is provided with conventional spider gears 43 and ring gear 44 mounted in the usual manner.

The pitch ratio of the gears 17 and 32 is equal to the diameter ratio of the drum 18 and the tire 21 so that normally the ring gear 44 remain stationary for the reason that, under normal circumstances, the side gears 37 and 38 are driven at equal speeds in opposite directions. If the tire 21 slips or creeps on the drum 18 the side gears 37 and 38 will not rotate at equal speeds and, consequently, the ring gear 44 will turn at a speed which is proportional to the slippage or creep.

To simulate braking and acceleration conditions, provision is made for applying a rotative force or torque to the ring gear 44. An input shaft 48 drives an input gear 49 which is meshed with the ring gear 44, the input shaft being connected through a clutch 53 of a well known type to a torque producing device 54 such as a torque motor or even a weighted lever. The torque producing device 54 applies a turning force to the input gear 49 to apply torque to the ring gear 44. Braking conditions are simulated when a rotative force is applied to the ring gear in one direction. When the rotative force is applied in the other direction acceleration conditions are simulated.

To measure slippage and creep of the tire 21 on the drum 18, a pointer 57 and scale 58 are provided. The pointer 57 is connected to and driven by the input shaft 48, the scale 58 being positioned adjacent to the pointer 57. Movement of the pointer relative to the scale is proportional to slippage and creep. Any other type of device which will indicate or measure angular displacement may be substituted for the pointer and scale.

In operation of the system, the motor 16 drives the shaft 13 to rotate the gear 17 and the drum 18. The gear 17 drives the gear 32, while the drum 18 drives the tire 21. By varying the rotative speed of the shaft 13, the tire 21 can be tested at different speeds. During the test the cylinder 29 urges the tire 21 against the drum 18 with the desired loading force.

With the clutch 53 disengaged the tire 21 is run under conditions simulating the conditions under which the front tire of an automobile runs. If the tire 21 does not creep or slip on the drum 18 the side gears 37 and 38 will rotate in opposite directions at equal speeds so that the ring gear 44 does not move. If, however, slippage or creep occurs, the side gears 37 and 38 will rotate at different speeds so that the ring gear 44 is turned. Movement of the ring gear 44 turns the input gear 49 to actuate the pointer 57. Total slippage and creep is indicated by the position of the pointer 57 on the scale 58.

To operate the tire 21 under braking conditions, the clutch 53 is engaged so that the torque producing device 54 acts through the input gear 49 to exert a turning force on the ring gear 44. The ring gear 44 will not actually turn unless the tire slips or creeps, but the torque introduced into the system through the input gear 49 will brake the tire. The braking force will thus be equal to the torque input. This braking force will remain the same regardless of the speed of the tire, if a constant input torque is used. By varying the amount of input torque, the braking force is varied. Thus, this system will test a tire under braking conditions at low and high speeds, without any energy being transferred out of the system. Thus, no energy dissipating apparatus (such as a Prony brake) is needed. Any slippage or creep of the tire will be evidenced by movement of the pointer 57.

This system can also be used for testing articles and apparatus other than tires. For example, gears can be substituted for the drum 18 and the tire 21 and an automatic transmission can be connected between the side gear 37 and the gear which replaced the tire 21, this gear being connected to the input shaft of the transmission and side gear 37 being connected to the output shaft of the transmission. The transmission can be loaded by applying a torque to the ring gear 44. The loading force will remain in the system, so that no energy dissipating apparatus is needed. Any slippage or lost motion in the transmission will be indicated by movement of the pointer 57.

It is to be understood that the embodiment disclosed herein may be modified or amended and that numerous other embodiments can be contemplated which will fall within the spirit and scope of the invention.

What is claimed is:

1. A testing system, comprising a rotating drive shaft, a differential having a ring gear and a pair of side gears, means interconnecting the drive shaft and one of the side gears for establishing a positive drive connection therebetween, means for connecting a test specimen to the drive shaft and the other side gear for providing a driving connection between said test specimen and said shaft, and means connected to the ring gear for indicating angular displacement of said ring gear.

2. An apparatus for testing a tire, comprising a rotating drive shaft having secured thereto a drive gear and a drum, a first axle shaft positioned parallel to the drive shaft and having secured thereto means for supporting a tire in engagement with the drum, a second axle shaft positioned parallel to the drive shaft and having secured thereto a driven gear, an idler gear interconnecting the drive gear and the driven gear, a differential having a ring gear and a pair of side gears, said side gears each being connected to one of the axle shafts, and means connected to the ring gear for applying a torque thereto.

3. An apparatus for testing a tire comprising a rotating drive shaft, a differential having a ring gear and a pair of side gears, a pair of axle shafts secured to said side gears, a driven gear secured to one of the axle shafts, means interconnecting the drive shaft and the driven gear for driving said one axle shaft in one direction, a drum secured to the drive shaft, means on the other axle shaft for supporting a tire in engagement with the drum in such a manner that said other axle shaft is driven in a direction opposite to said one direction, and means connected to the ring gear for indicating the angular displacement thereof.

4. An apparatus for testing a tire, comprising a rotating drive shaft, a differential having a ring gear and a pair of side gears, a pair of axle shafts secured to the side gears and positioned substantially parallel to the drive shaft, means interconnecting the drive shaft for establishing a positive drive connection therebetween, means mounted on the other of said axle shafts for supporting a tire, means interconnecting the tire and the drive shaft for providing a frictional drive connection therebetween, and means for applying a torque to said ring gear.

5. An apparatus for testing a tire, comprising a drive shaft, means connected to the drive shaft for rotating said shaft, a differential having a ring gear and a pair of side gears, a pair of axle shafts secured to the side gears and positioned parallel to the drive shaft, a drive gear secured to the drive shaft, a driven gear secured to one of the axle shafts, an idler gear meshed with the drive and the driven gear to interconnect said drive and driven gears, means on the other axle shaft for supporting a tire to be tested, a drum secured to the drive shaft in driving engagement with said tire, and means acting on the ring gear for applying a torque thereto.

6. An apparatus for testing a tire, comprising a rotating drive shaft, a differential having a ring gear and a pair of side gears, a pair of axle shafts secured to the side gears, a drive gear secured to the drive shaft, a driven gear secured to one of the axle shafts, an idler gear positioned to interconnect the drive gear and the driven gear, means on the other axle for supporting a tire, a drum secured to the drive shaft in driving engagement with said tire, means connected to said other axle shaft for urging the tire against the drum, means connected to the ring gear for applying a torque thereto, and means connected to said ring gear for measuring the angular displacement thereof.

7. An apparatus for testing a device, comprising a rotating shaft a differential having a ring gear and a pair of side gears, means interconnecting the drive shaft and one of the side gears for providing a positive drive connection therebetween, a device to be tested connected to the other side gear, a fluid chamber for urging said device against the drive shaft to provide a driving connection between said drive shaft and said other side gear, and means connected to the ring gear for applying a torque thereto.

8. A testing system, comprising a rotating drive shaft, a differential having a ring gear and a pair of side gears, an axle connected to each side gear, said axles being parallel with said shaft, means for connecting said drive shaft to one of said axles, a device to be tested mounted on the other said axle, means for supporting said device in engagement with said drive shaft, and means for applying a torque to the ring gear.

References Cited in the file of this patent

UNITED STATES PATENTS 1,839,354     Spath _____ Jan. 5, 1932
1,893,529     Yorgason _____ Jan. 10, 1933